(12) United States Patent
Vladutescu

(10) Patent No.: US 11,480,681 B2
(45) Date of Patent: Oct. 25, 2022

(54) LIDAR SYSTEM FOR DETECTION OF SMALL FLYING OBJECTS

(71) Applicant: Research Foundation of the City University of New York, New York, NY (US)

(72) Inventor: Viviana Vladutescu, Brooklyn, NY (US)

(73) Assignee: Research Foundation of the City University of New York, New York, NY (US)

( * ) Notice: Subject to any disclaimer, the term of this patent is extended or adjusted under 35 U.S.C. 154(b) by 864 days.

(21) Appl. No.: 16/365,203

(22) Filed: Mar. 26, 2019

(65) Prior Publication Data

US 2019/0293766 A1 Sep. 26, 2019

Related U.S. Application Data

(60) Provisional application No. 62/648,012, filed on Mar. 26, 2018.

(51) Int. Cl.
| | |
|---|---|
| *G01S 17/87* | (2020.01) |
| *G01S 7/481* | (2006.01) |
| *G02B 26/08* | (2006.01) |
| *G01S 17/58* | (2006.01) |
| *G01S 17/93* | (2020.01) |
| *G01S 17/89* | (2020.01) |

(52) U.S. Cl.
CPC ............ *G01S 17/87* (2013.01); *G01S 7/4813* (2013.01); *G01S 7/4817* (2013.01); *G01S 17/58* (2013.01); *G01S 17/89* (2013.01); *G01S 17/93* (2013.01); *G02B 26/0833* (2013.01)

(58) Field of Classification Search
CPC . G02B 26/0833; G01S 7/4813; G01S 7/4817; G01S 17/58; G01S 17/87; G01S 17/89; G01S 17/93
See application file for complete search history.

(56) References Cited

U.S. PATENT DOCUMENTS 9,195,060 B2  11/2015  Mori et al.

OTHER PUBLICATIONS

Schmidt, M. et al.; New York Times; A Drone, Too Small for Radar to Detect, Rattles the White House; Jan. 26, 2015; 4 pages; https://www.nytimes.com/2015/01/27/us/white-house-drone.html.
Beckhusen, R.; Super-Silent Owl Drone Will Spy on You Without You Ever Noticing; www.wired.com; Jul. 19, 2012; 3 pages; https://www.wired.com/2012/07/owl/.
Aaronia AG; Datasheet for Aaronia Drone Detector; Aug. 2017; 8 pages; https://aaroniausa.com/wp-content/uploads/2017/08/Drone-Detection-System.pdf.

(Continued)

*Primary Examiner* — Luke D Ratcliffe
*Assistant Examiner* — Woohyeong Cho
(74) *Attorney, Agent, or Firm* — Peter J. Mikesell; Schmeiser, Olsen & Watts, LLP

(57) ABSTRACT

A LiDAR system for tracking small flying objects. Multitude of individual LiDAR heads are placed on arcuate frames that intersect to define a dome. Each LiDAR head can be independently rotated with six degrees of freedom. Optical data signals are routed from each LiDAR to a central mirror disposed within the dome and then to a spectrometer for data processing. Upon detection of a possible target by one or more of the LiDAR heads, additional LiDAR heads are rotated to also focus on the possible target, thereby enhancing imaging of the target.

11 Claims, 10 Drawing Sheets

(56) References Cited

OTHER PUBLICATIONS

Quadcopter Cloud; Guides; Can Small Drones be Detected by Radar?; May 7, 2016; http://www.quadcoptercloud.com/can-small-drones-detected-radar/.

Birch, G. et al.; Sandia Report; UAS Detection, Classification, and Neutralization: Market Survey 2015; Apr. 20, 2015; 74 pages; Sandia National Laboratories.

Eisenbeiß, H.; UAV Photogrammetry; A dissertation submitted to ETH Zurich for the degree of Doctor of Sciences; 2009.

Hokuyo; Scanning range finder (Sokuki Sensor); 2009; 3 pages; Hokuyo Automatic Co. Ltd.

Aerotech; Two-Axis Motion Simulators; 5 pages; downloaded Mar. 18, 2017; https://www.aerotech.com/product-catalog/motion-simulator/two-axis-motion-simulators.aspx.

Calfee; Technical White Paper; 12 pages; downloaded Mar. 18, 2017; https://calfeedesign.com/technical-white-paper-1/.

Faro Focus; Laser Scanner S, M & X Series—Perfect Instrument for 3D Documentation and Surveying; downloaded Mar. 18, 2017; 2 pages.

Aspera; Informational brochure for Aspera Software; 2012; https://asperasoft.com/software/.

Wong, K.; The Hill; ISIS used 'Styrofoam' drone to Kurdish; Oct. 12, 2016; https://thehill.com/policy/defense/300609-styrofoam-isis-drone-killed-peshmerga-forces-injured-french-troops.

Rees, M.; UST; DARPA Issues RFI for Counter-UAS Capabilities; Aug. 16, 2016; https://www.unmannedsystemstechnology.com/2016/08/darpa-issues-rfi-for-counter-uas-capabilities/.

Riegl; Data-Sheet for LMS-Q160 (Lightweight Anti-Collision Laser Sensor); Jul. 28, 2010.

NKT Photonics; Supercontinuum Generation in Photonics Crystal Fibers; Jul. 2009; 10 pages.

Smith, B. et al.; Single chip lidar with discrete beam steering by digital micromirror device; Optics Express; Jun. 19, 2017; 14 Pages; vol. 25, No. 13.

DroneSheild; Product information Datasheets for DroneGun Tactical, DroneCannon RW, DroneNode, DroneSentry,DroneSentinel, RadarZero,RadarOne, RfOne, DroneOpt, DroneCannon, BaseUnit, and DroneShieldComplete; Feb. 2, 2018.

Abari, C. et al.; A reconfigurable all-fiber polarization-diversity coherent Doppler lidar: principles and numerical simulations; Applied Optics; Oct. 20, 2015; pp. 8999-9009; vol. 54, No. 30.

Sun, X. et al.; HgCdTe e-APD detector arrays with single photon sensitivity for space lidar application; Proceedings, Advanced Photon Counting Techniques VIII; 2014; vol. 9114; 10 pages.

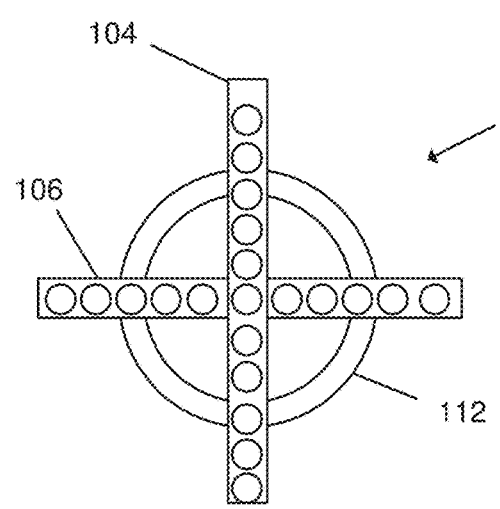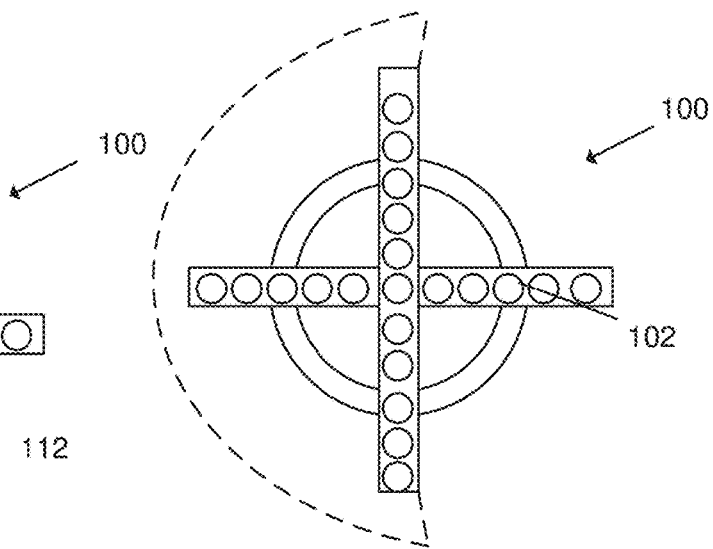
FIG. 1A   FIG. 1B
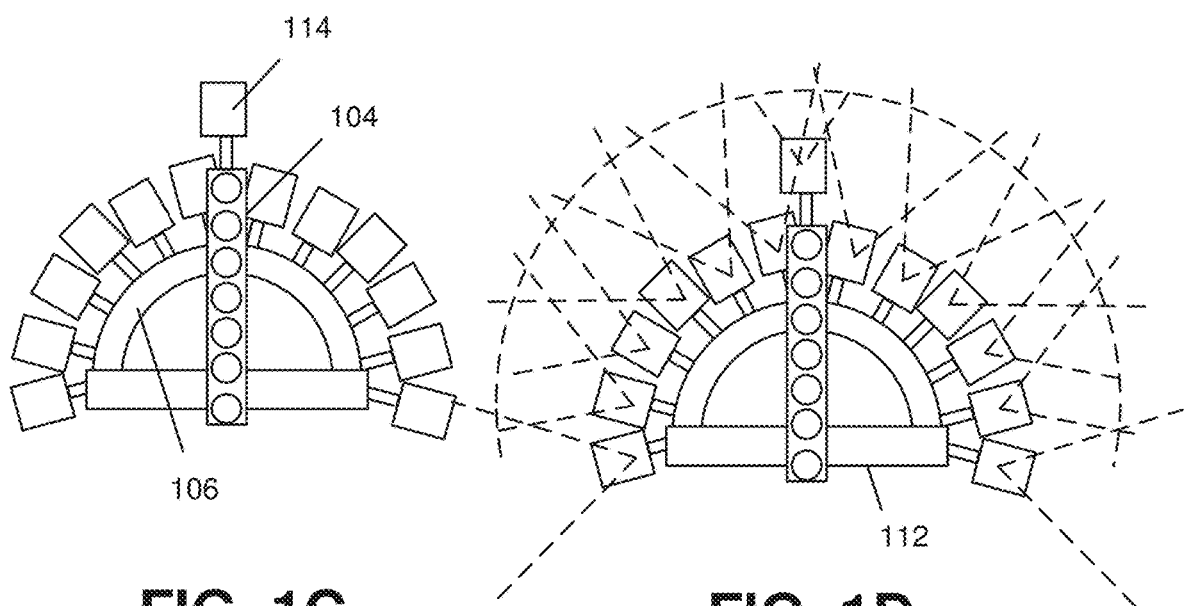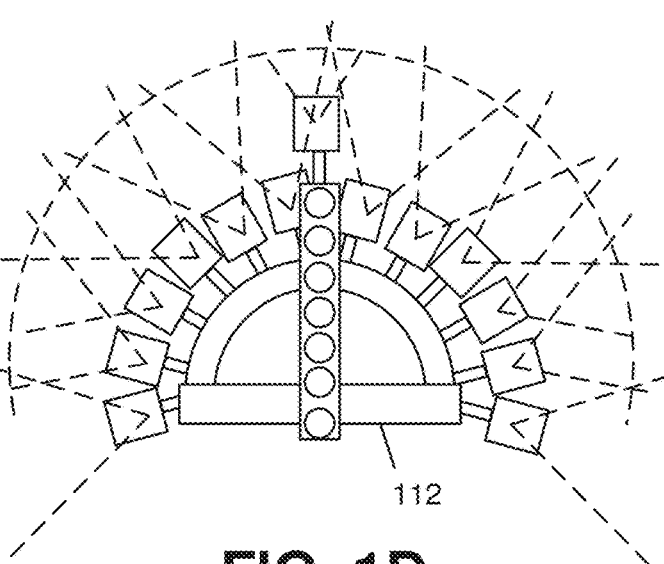
FIG. 1C   FIG. 1D

LIDAR SYSTEM FOR DETECTION OF SMALL FLYING OBJECTS

CROSS-REFERENCE TO RELATED APPLICATIONS

This application claims priority to and is a non-provisional of U.S. Patent Application 62/648,012 (filed Mar. 26, 2018, the entirety of which is incorporated herein by reference.

BACKGROUND OF THE INVENTION

Lidars systems have been developed since 1950s. Since then, several types of lidars have been developed with applications in surveillance, environmental monitoring, and range detection. Of these, a few are notable for their performance: Mie-scattering lidar for detection of aerosol and clouds; Raman-Lidar using vibrational and rotation-Raman bands to detect aerosol, cloud, water vapor, ozone, $CH_4$ and temperature; DIAL (differential absorption lidar) used to detect trace-gas, ozone, water vapor, $SO_2$, $NO_2$, etc; High-Spectral Resolution Lidar (HSRL) used to separate molecular and aerosol scattering, aerosol & cloud; Raylelgh-Lidar for stratosphere-mesosphere temperature measurements; resonance-fluorescence lidar used to detect concentrations of metal atom Na, Fe, Ca; and Doppler-Lidar for wind field measurements. These lidars use a limited (single digit) number of monochromatic channels. Additionally, there are Geiger mode lidars (i.e. Machete Photon Counting LADAR of US NAVY) mounted on airplanes scanning through canopy for single photon detection, scanning terrain mappers and range finders (i.e. Titan of Teledyne Optech). Below are brief technical details and working principles of the lidar systems indicated above:

The Mie-scattering lidars generally work in a mono-axial mode and transmit and receive radiation in one to three monochromatic wavelengths. The scattered radiation is detected using a fixed telescope that focuses the light into the receiving optical train which comprises mirrors, lenses and detectors selected for the three wavelengths transmitted by the laser. The ground-based Mie lidar systems are static, while the ones mounted on airplanes and satellites display a certain degree of scanning capabilities. These lidar systems are used for scanning, mapping, bathymetry, vegetation classification and environmental modelling, and include on average three active beams with independent wavelengths of 355 nm, 532 nm, 1064, nm and/or 1550 nm. Each beam has effective sampling rates on the orders of kHz.

The Raman lidar can be designed individually or in conjunction with the Mie-scattering lidar. The working principle of these type of lidars is similar to the Mie-scattering lidar, the only difference consisting in the type of detectors used at the receiving end. In this system the emitted radiation excites the target of interest, which absorbs and then emits radiation in its own Raman range. Therefore, tuning a detector to the corresponding Raman emitted radiation by the target, one can determine concentrations of the species of interest: aerosol, cloud, water vapor, ozone, methane and temperature. For temperature detection the laser transmits radiation in two wavelengths (for example 532 nm and 660 nm) which excite the oxygen molecules and the receiver detects the Raman shifted radiation emitted by oxygen molecules. The receiving system collects the Raman shifted radiation emitted by the oxygen molecule on two detectors and then the data is further processed for temperature retrieval.

The Rayleigh lidar is based on a methodology to convert density measurements to temperature—first developed by Elterman (1953, 1954). More recent systems, such as the one at Utah State Univ., uses two Nd:YAG lasers for a total transmitting power of 42 W and four telescopes used simultaneously for an overall receiving area of 5 $m^2$. This system measures densities temperature and wave parameters between 65-107 km. The Rayleigh lidars u e a frequency doubled Nd:YAG laser operating in 532 nm. Older systems employ telescopes with diameters near 1 m and lasers with average powers 10-50 W. These systems typically have powers of 25 $W/cm^2$.

The DIAL (differential absorption technique can be extremely sensitive and is able to detect gas concentrations of few hundred parts per billion (ppb): trace-gas, ozone, water vapor, $SO_2$, $NO_2$, NO, etc. This lidar works by sending out two light pulses of different wavelengths, launched along the same path into the atmosphere, and two corresponding backscatter profiles are simultaneously measured. The gas concentration detection is based on the strength of the on band (absorption band of the gas) and off band signals.

Resonance-Fluorescence lidar rely on the process in which the energy of an incoming photon coincides with the energy of a transition in the level scheme of an atom, ion, or molecule, and is reemitted at the same or longer wavelength. (In lidar, we consider only those cases in which both wavelengths are the same). The resonance results in the first stage in absorption (i.e. see DIAL for measurement of Hg) and then reemission or scattering (resonance fluorescence) of radiation. Examples of such lasers can be found in Claus Weitkamp, "Lidar. Range Resolved Optical Remote Sensing of the Atmosphere", pg. 307-323. This lidar system uses laser types such as dye, $N_2$ ($\lambda$=337 nm), Ne. It detects Na, Fe, Ca, $Ca^+$, Li, K, $OH^-$ in the upper atmosphere and $SO_2$, $NO_2$, $I_2$, NO and OH in the lower atmosphere. It is also used for detection of oil slicks on water, for agricultural measurements (chlorophyll, algae), marine baseline survey, and water/temperature salinity.

The Doppler lidar is used to detect wind velocity and direction based on homodyne or heterodyne designs. More recent Doppler lidar systems designs allow for the detection of the polarization of the Doppler shifted returned signal.

Smaller size and power scanning lidars are using IR (infrared) radiation for obstacle detection. These type of lidars are mounted on robots or autonomous vehicles. The penetration distance of these lidars is usually very small (up to max 500 m).

Supercontinuum Background

Supercontinuum is a nonlinear phenomenon discovered in crystals exposed to very intense mode locked laser radiation. The crystals exposed to these fields absorb the laser energy and emit radiation in a very broad band, which has a relatively uniform intensity across the spectrum, comparable to the intensity of the laser source used in the generation of the supercontinuum. They also preserve well the polarization of the laser beam. Of these crystals, it is worth mentioning the GaAs which emits supercontinuum in far infrared (~10 um), or photonic crystal fibers (also known as holy fibers) that absorb radiation in 800 nm and emit radiation in a range from UV (ultra violet) to VIS (visible) to IR (infrared). The detection principles are based on the general lidar equation which is given by:

$$P(\lambda, R) = \frac{K}{R^2}\beta(\lambda, R)\exp\left[-2\int_0^R \alpha(\lambda, R)dr\right]\xi(R) \quad (1)$$

where $\alpha(\lambda,R)$ is the atmospheric optical extinction coefficient [m$^{-1}$], $\beta(\lambda,R)$ atmospheric optical backscatter coefficient, $\xi(R)$ is the overlap factor (varies between 0 and 1). Here K is a system constant [W m$^3$] defined as:

$$K = \frac{P_0 c}{2} A_{\mathit{eff}}.$$

In this equation $P_0$ is the peak energy in Joules, and $A_{\mathit{eff}}$ is the effective telescope area measured in m$^2$.

If a homogeneous atmosphere and ideal system conditions are assumed, the LiDAR equation takes the form:

$$P(R) = \frac{K}{R^2} \beta \exp(-2\alpha R),$$

where $\beta$ is the backscatter and the exponential term is the transmittance: $T(\lambda,R)=\exp[-2COT(R)]$. Here the term $\alpha R$ is also known as the optical thickness (COT): $COT(R)=\int_0^R \alpha(\lambda,r)dr$.

The subject matter disclosed herein relates to the detection of small flying objects including unmanned aerial vehicle (UAV) such as drones. Conventional radio detection and ranging (RADAR) systems have difficulty detecting objects with small cross sections or objects formed from certain polymers (e.g. STYROFOAM®). Infrared (IR) detection systems have difficulty detecting drones with shielded motors and power supplies. Acoustic detection systems often fail to detect battery-operated drones and electromagnetic (EM) detection systems do not detect drones with no radio frequency (RF), WiFi, RC or IR communication links.

One major concern when using any optical system for detection of such UAVs is not the spectral discrimination of the vegetation, but rather in the confusion between birds (or flock of birds) with individual drones (or swarms of drones). The spectral discrimination of vegetation is performed based on relatively well-known techniques using the reflectance properties. The sharp change in reflectance from vegetation at the red edge (700-730 nm) can give information about the type of vegetation and its health. A normalized difference red edge index (NDRE) or Normalized Difference Vegetation Index (NDVI) can be used to analyze whether images obtained from multi-spectral sensors contain vegetation or not.

Therefore the focus of existing research is towards, differentiating between natural and human made materials by: rapid scanning, imaging and spectrally analyzing the moving targets. Several studies of plumage reflectance indicate that most of the birds have high reflectance in spectral regions from 300 nm to 800 nm with a known reflectance pattern for each type of bird. Studies of plumage reflectance, performed in and outside an integrating sphere indicate, for example, that the magnificent hummingbird crown has a strong broadband reflection in the 430-450 nm range; the feral pigeon nape has a fluctuating reflectance pattern between 300 nm and 800 nm with peaks at 350, 450, 550, 790 nm; the European jay has a broad relatively flat reflectance spectrum between 300 and 600 nm; and kingfisher crown has a broad reflectance spectrum relatively flat between 300 to 509 nm and then increases slowly to peak at 550-600 nm. All these patterns and directional coloration are difficult to mimic in UAVs, which rather have sharp reflectance in certain bands based on colors.

The discussion above is merely provided for general background information and is not intended to be used as an aid in determining the scope of the claimed subject matter.

SUMMARY

A LiDAR system for fast tracking and broadband spectral detection of small flying objects. Multitude of individual LiDAR heads are placed on arcuate frames that intersect to define a dome. Each LiDAR head can be independently rotated with six degrees of freedom. Optical data signals are routed from each LiDAR to a central mirror disposed within the dome and then to a spectrometer for data processing. Upon detection of a possible target by one or more of the LiDAR heads, additional LiDAR heads are rotated to also focus on the possible target, thereby enhancing imaging of the target.

In a first embodiment, a LiDAR system is provided. The LiDAR system comprises a first arcuate frame and a second arcuate frame, wherein the first arcuate frame and the second arcuate frame are disposed perpendicular one another and defining a volume of an interior dome; a plurality of LiDAR heads, each connected to either the first arcuate frame or the second arcuate frame by a first goniometer, a second goniometer and a rotation stage, such that each LiDAR head can be independently rotated with six degrees of freedom; a computer processor for independently actuating the rotation stage, the first goniometer and the second goniometer of each LiDAR head in the plurality of LiDAR heads; wherein the volume of the interior dome houses: a laser source that supplies laser light to the plurality of LiDAR heads; a central mirror (CM); a plurality of guiding mirrors (GM); at least one concave collecting mirror (CCM) that directs reflected laser light from the LiDAR heads to the central mirror (CM) using the plurality of guiding mirrors (GM); at least one spectrometer for processing the reflected laser light.

In a second embodiment, a method for detecting an object using LiDAR is provided. The method comprising: detecting a target of interest using a LiDAR system comprising: a first arcuate frame and a second arcuate frame, wherein the first arcuate frame and the second arcuate frame are disposed perpendicular one another and defining a volume of an interior dome; a plurality of dynamic LiDAR heads, each connected to either the first arcuate frame or the second arcuate frame by a first goniometer, a second goniometer and a rotation stage, such that each dynamic LiDAR head can be independently rotated with six degrees of freedom; a computer processor for independently actuating the rotation stage, the first goniometer and the second goniometer of each dynamic LiDAR head in the plurality of dynamic LiDAR heads; wherein the volume of the interior dome houses: a supercontinuum laser source that supplies laser light to the plurality of dynamic LiDAR heads; a central mirror (CM); a plurality of guiding mirrors (GM); at least one concave collecting mirror (CCM) that directs reflected supercontinuum laser light from the dynamic LiDAR heads to the central mirror (CM) using the plurality of guiding mirrors (GM); at least one spectrometer for processing the reflected supercontinuum laser light; wherein, upon detection of the target of interest, the microprocessor actuates the rotation stage, the first goniometer or the second goniometer of at least one additional dynamic LiDAR head from the plurality of dynamic LiDAR heads such that the at least one additional dynamic LiDAR head emits supercontinuum laser light on the target of interest, thereby enhancing imaging of the target of interest.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 1A is a front view of a LiDAR system;

FIG. 1B depicts the front view with a select scanning angle depicted;

FIG. 1C is a top view of the LiDAR system;

FIG. 1D depicts the top view with a select scanning angle depicted;

DETAILED DESCRIPTION OF THE INVENTION

Figure 2:
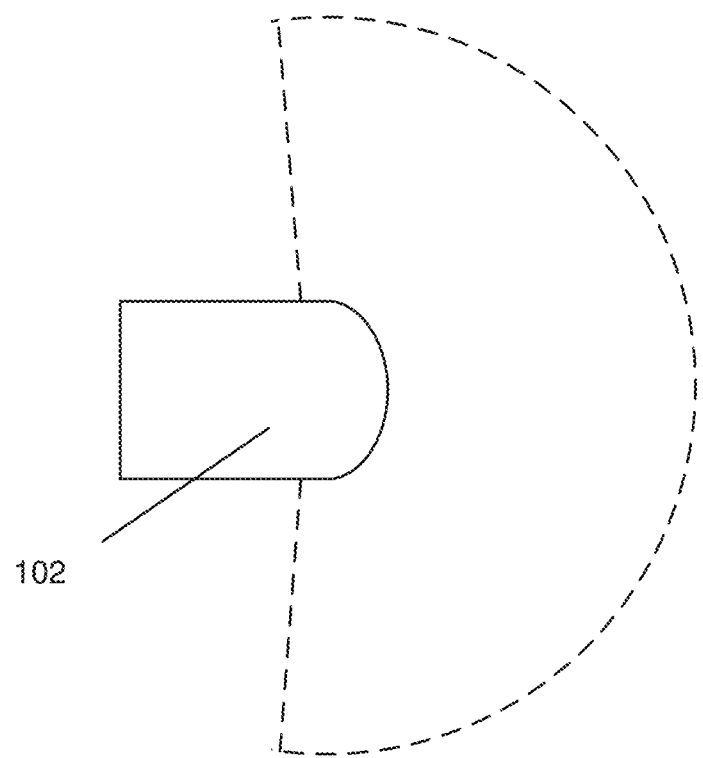
FIG. 2 is a block representation of an individual LiDAR head.

This disclosure provides an optical surveillance system for detection, and classification, of unmanned aerial systems. Extensive research by several labs and institutions lead to the conclusion that there is no existing drone detection, classification, identification, and/or neutralization system that can perform with accuracy against background clutter in complex terrain. A need for such a system therefore exists.

The disclosure provides a dynamic multi-LiDAR system used in scanning/tracking modes to detect small flying objects or gases present in the atmosphere with full hemispherical coverage area or larger.

The system has multitude of individual LiDAR heads placed on arcuate frames. The frames intersect at their center and are provided with holes that permit the radiation to travel through them in the outward direction towards the telescope of the corresponding dynamic LiDAR heads (LH) and further toward the target/s, and the inward direction, toward the detectors.

The LiDAR heads are placed on the frames above the corresponding holes in the frame. Adjacent to each hole there are struts holding the LiDAR head fixed mirror (LHFM), part of the given LiDAR head, and centered above the hole. Between the LHFM and the frame there are: a first goniometer, mounted on the frame, a rotation stage mounted on the first goniometer, and a second goniometer mounted on the rotation stage. These systems have nanometer precision for accurate detection. The second goniometer holds a mini-telescope that has an annular primary mirror reflective on both sides and shaped such that its front side focuses all returned signals onto the annular secondary mirror. The reflective back surface of the primary mirror is useful for capturing the returned radiation, for telescope positions other than the resting position (normal to the frame). The back reflective surface guides any radiation directed to it by the LHFM, through the hole in the frame and onto the guiding mirrors placed in the spacing below the arcuate frame. The radiation reflected by the LHFM onto the back of the primary mirror, gets to the LHFM by reflection from the secondary mirror and through the spacing in the annular primary mirror.

The transmitted radiation is emitted by a combination of Ti:Sapphire, optical coupler, photonic crystal fibers, micro electrical mirrors (MEM) or digital micromirror devices (DMD), lidar head fixed mirrors (LHFM) and primary mirror of the individual LiDAR heads in this particular order. The supercontinuum radiation emitted by photonic crystal fibers (PCF) is captured by DMD ad sent outwards via the last of the guiding mirrors (in the train of guiding mirrors) through the holes in the frame and the annular mirrors of the telescope. In telescope positions other than the normal to the frame, the guiding mirrors reflect the supercontinuum towards the back of the annular primary mirror. The radiation reflected off the back of the annular primary mirror is captured by the LHFM and sent outwards through the telescope (annular primary and annular secondary mirrors). The scope of the guiding mirrors (GM) is to reflect the returned radiation towards the convex collecting mirror and further to the central mirror, all placed in the space bounded by the frames. These guiding mirrors can be encapsulated in tubes to prevent contamination of the returned signal with light from other sources.

The receiving sub-system has field stops, collimating lenses, polarization beam splitters, spectrometers that detect broadband signals, tunable filters, focusing lenses, and photomultiplier tubes or avalanche photodiodes for detection of selected bands in the returned supercontinuum spectrum. This system could include a tracking LiDAR placed at the junction of the frames, and a collocated RADAR.

FIGS. 1A to 1D illustrate a fast scanning/imaging broadband multi Light Detection and Ranging (multi-LiDAR (light detection and ranging) system 100. FIG. 1A and FIG. 1B are front views of the system 100 while FIG. 1C and FIG. 1D are top views of the system 100. The support of the multi-LiDAR system 100 has a circular base 112 with at least one semicircular arcuate frame (e.g. frames 104, 106) placed along the diameter. In the embodiment of FIG. 1A, two such semicircular arcuate frames are depicted. Additional frames may be used as required by the temporal and spatial resolution of the image collected by the individual LiDARs. The frames intersect each other in a dome-like formation. The dimensions of the frames vary as a function of the number of individual LIDARs, k, desired between the base of the frame and top of the frame. The frame can be made of carbon fiber to ensure low weight and strength. The materials used for the frame should be resistant to extreme changes in temperature with very low elasticity constants, as significant misalignments in the multi-LiDAR system may use additional computational power for corrections.

FIG. 2 depicts an individual LiDAR 102. In normal operation the individual LiDARs 102 scan in one plane that is perpendicular to the plane tangential to the frame at the location the LiDAR heads are mounted on. Each scanning LiDARs 102 has a scanning range of 190° in one plane.

Figure 3A:
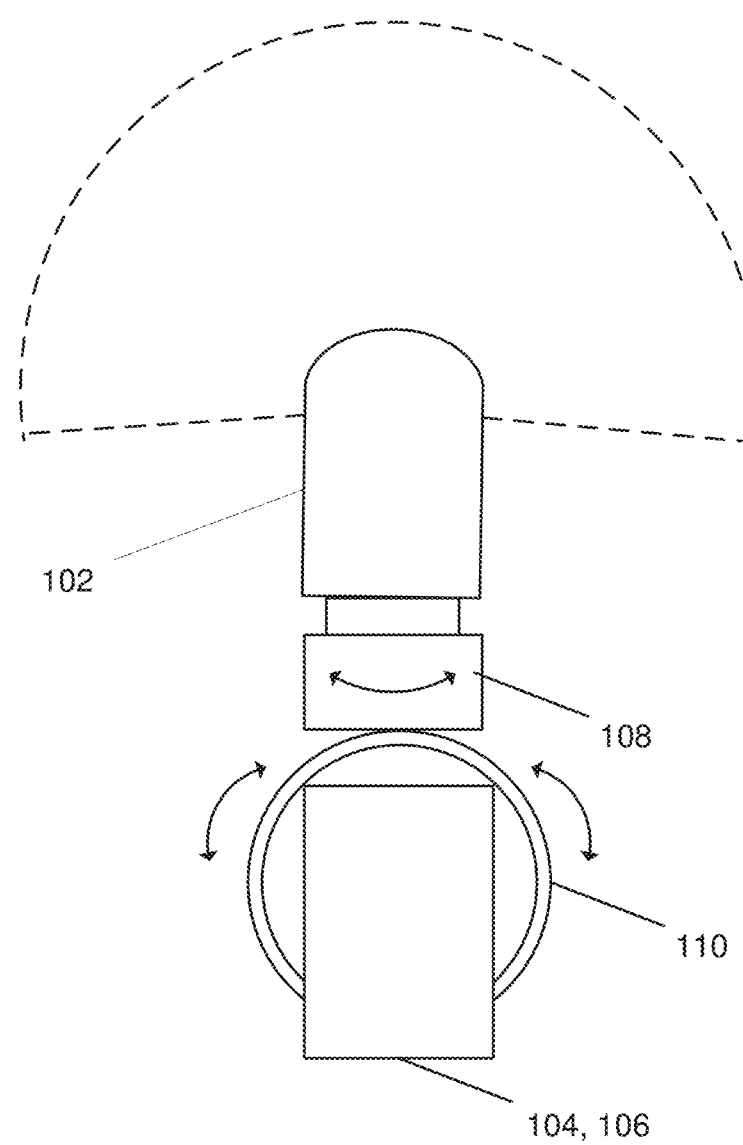
FIG. 3A depicts a rotation stage and goniometers that mount each individual lidar.

As shown in FIG. 3A, the telescope of individual LiDARs 102 are mounted on goniometers 110 and rotation stages 108 controlled by a proportional-integral-derivative (PID) controllers that allow each individual LiDAR 102 to roll, pitch and yaw around the x, y, z coordinates, and thus conferring each individual LiDAR 102 a minimum of 6 degrees of freedom (x, y, z, roll, pitch, and yaw) and maneuver the LiDAR 102 set toward the direction controlled by the processor. Each LiDAR head works independently of the other LiDAR heads. The controllers are incorporated in the rotation stages 108 and goniometers 110 and make the connection between the main processor and each individual LiDAR 102. The LiDAR system 100 allows a minimum scanning angle of 300° in one plane (this angle can vary based on the design of the goniometers 110 and size of LiDAR head fixed mirrors (LHFM)).

Figure 3B:
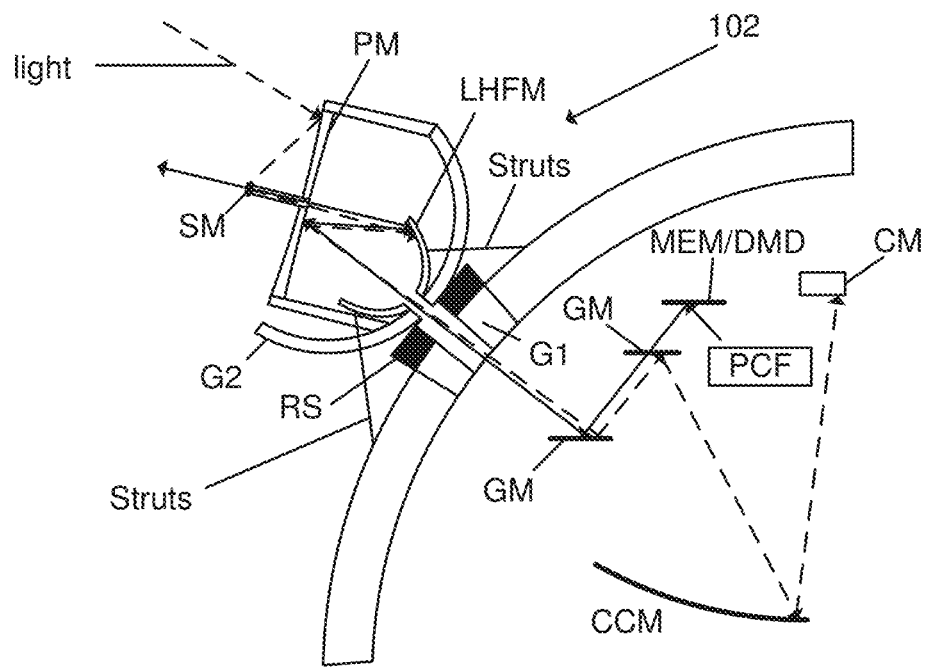
FIG. 3B is a schematic view of components of FIG. 3A.

Referring to FIG. 3B, the LiDAR system is based on supercontinuum broadband transmission-reception, provided by ultrafast high-power lasers radiation (not shown in FIG. 3B), fed into photonic crystal fibers (PCF) and mirror systems which transmit the outgoing broadband radiation and collect the scattered broadband radiation. In this manner, the LiDAR 102 can function as dynamic telescopes. The LiDAR system is based on a set of lidar heads, guiding mirrors ($GM_1$, $GM_2$, ... $GM_n$), collecting mirrors (CM), lenses-collimating (CL) and focusing (FL), tunable interference filters and detectors placed inside the frame along with the laser source, photonic crystal fibers (PCF) for supercontinuum creation and MEMs or DMDs. The light reflected by the target is collected by an annular primary mirror (PM) of the lidar head telescope. An annular secondary mirror (SM), and a concave collecting mirror (CCM) is also present. The system of mirrors for each individual LiDAR 102 is denoted by $MA_n$ and is mounted on the rotation stages 108 and goniometers 110, as any other individual scanning LIDARs that would be used. The advantage of the LiDAR 102 resides in a large choice of lasers with high emitted power levels that increase the coverage area, as well as the revisit time.

Figure 3C:
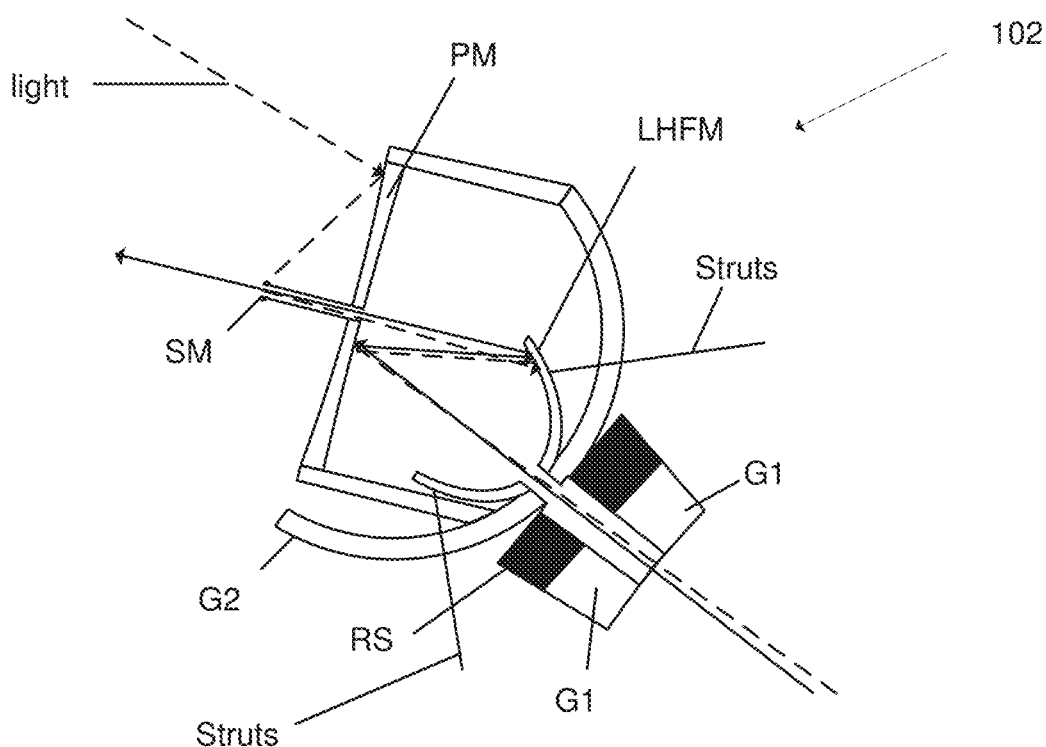
FIG. 3C is a closeup view of a portion of FIG. 3B.

As shown in FIG. 3C, the design of one individual LiDAR head has a first goniometer (G1) which is attached directly to the frame and supports a rotational stage. On top of the rotational stage there is a second goniometer G2 that supports the mount of the annular paraboloid primary mirror (PM) and the annular secondary mirrors (SM) via struts mounted monolithically on the primary mirror mount. The primary mirror is reflective on both sides to allow for the signal to be guided properly through the empty cavity in the frame, when the transmitting telescope is on a position different from the resting position and forms a predefined angle, different from 90°, with respect to the tangent to the frame at the location of that mini lidar head. The primary mirror is attached monolithically to a frame which can slide on goniometer G2, based on commands gave by the processor. Within the space between the primary mirror and goniometer (G2) there is a static mirror (LHFM-lidar head fixed mirror) supported directly by the frame via struts.

The annular secondary mirror (SM) is mounted on struts in a fixed position directly onto primary mirror mount. The maximum angular change in the position of the transmitting/receiving lidar head is limited by the design and size of the LHFM and the goniometers. A canfield joint to maneuver the lidar head telescope would not be appropriate in this design due to required precision and speed. However, if these are not mandatory requirements the motion system could be replaced by a canfield joint but the spatial and temporal resolution may be much lower.

This system transmits the high-power laser beam into the PCF only if the processor sends a signal to the time division multiplexer (TDM) optical coupler based on assessment of a potential target or on continuous basis (depends on the user's needs). This scanning LiDAR system is capable of tracking the target and communicating in near real time the trajectory of the target to the main processor, processor that can further use the data for other applications such as controlling all the individual lidar heads to point in the required direction.

Referring again to FIG. 1, in some embodiments, LiDARs are complemented by an additional scanning LiDAR 114 using a mirror (e.g. a MEMs mirror or digital mirror devices-DMDs) and laser placed at the top of the dome at the junction of the two frames which is activated based on needs, determined by the presence of a target, as detected by the individual LiDARs 102. Each individual LiDAR 102, the rotation stage 108 and goniometer 110 can be synchronized with all other individual LiDARs 102, rotation stages 108 systems and goniometers 110, as well as the tracking scanning LiDAR 114 on the top of the multi-LiDAR scanning system. This increases revisit time and therefore detect faster and smaller flying objects. The individual LiDARs 102 are controlled to point in the direction of suspected target for range finding and higher resolution imaging.

The scanning LiDAR 114 is activated by the processor if a potential target has been detected. The scanning LiDAR 114 tracks the target and communicates the trajectory of the target in near real-time to the main processor. The processor can use the trajectory data for other applications such as controlling the individual LiDARs to point in the required direction. The scanning LiDAR 114 is also mounted on a motion subsystem as illustrated in FIG. 3A.

Alternative designs can use a lidar head, similar in design to the other lidar heads, and scanning in continuous mode, while the others are in idle mode, or operating in the normal position, only. In case the continuous scanning lidar head detects a target in motion, a feedback loop would command the other lidar heads to scan in the determined direction based on a predefined algorithm.

Figure 4:
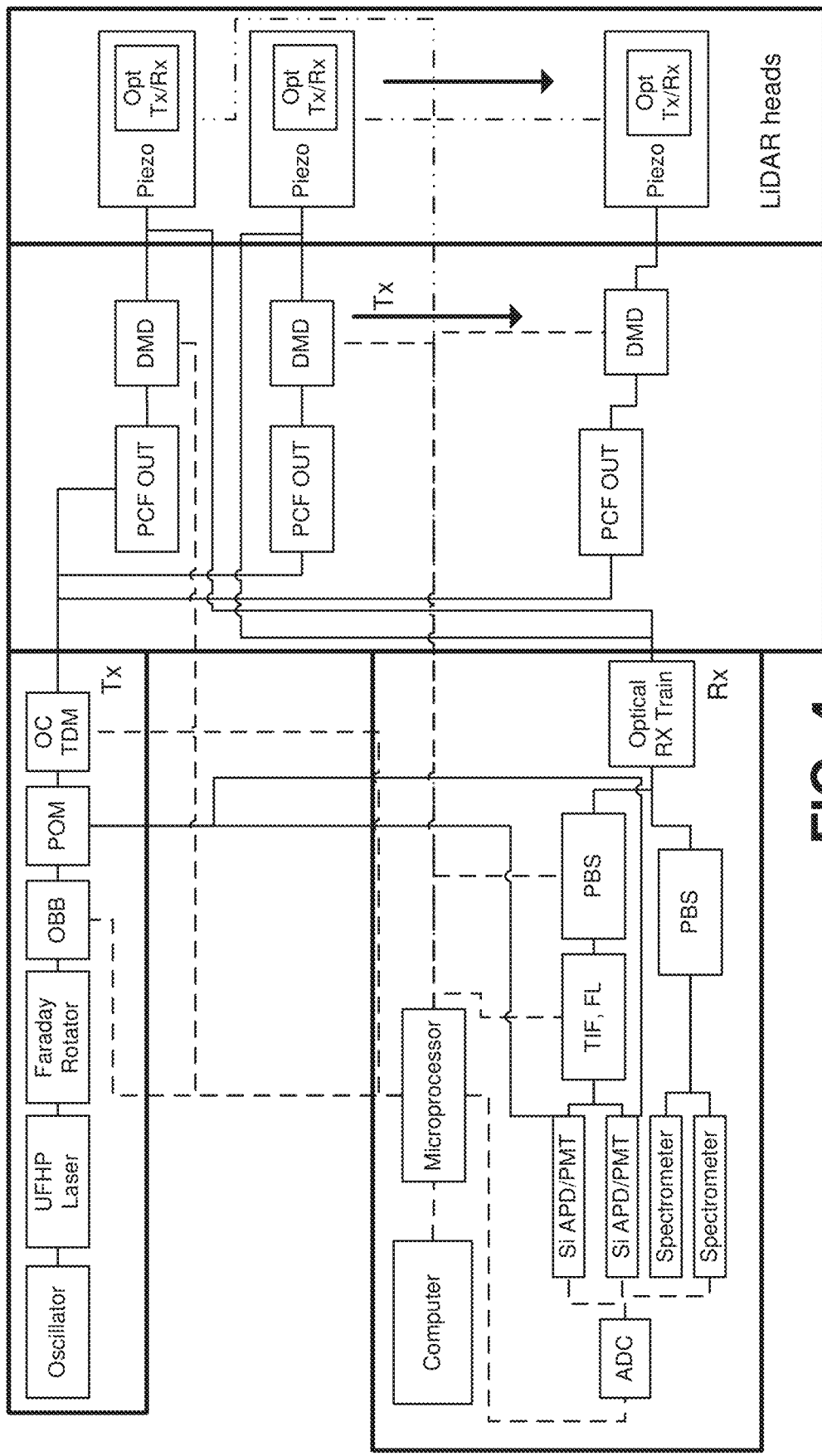
FIG. 4 depicts a block diagram of the main elements in a transmitter and receiver of the system housed inside the frame.

FIG. 4 depicts a block diagram of the main elements in a transmitter and receiver of the system housed inside the frame. The system comprises multiple subsystems including the transmitting subsystem (Tx) that has an oscillator seed for an ultrafast high power laser (UFHP); a Faraday rotator; a pick off mirror (POM), an electronically controlled optical coupler; a photonic crystal fibers transmitting (PCF) supercontinuum laser light to the digital mirror devices (DMDs); a lidar heads collecting and transmitting the laser beam towards the target of interest and detecting the return signal (the LiDAR heads subsystems are the piezo-controlled optical transmitter/receiver (Opt Tx/Rx) elements); and the receiving subsystem (Rx).

Overall design of the transmitter (Tx)-receiver (Rx) system: The system is controlled by a microprocessor responsible for the motion control of the different components in the transmitter and receiver subsystems. The motion of every element in the multi-LiDAR system is based on feedback loops from the microprocessor and the subsystems directly.

The energy source of the LiDAR system may be an oscillator in conjunction with a Ti:Sapphire laser, a Faraday rotator to prevent any back reflections (4%) from the optical elements in the system to enter the oscillator (laser source), and optical couplers to sequentially feed the focused high power ultrafast laser beam into each photonic crystal fibers to obtain high supercontinuum output, which preserves the polarization of the beam.

The transmitter/receiver multi lidar system has k mini LiDAR heads (LH) installed on top of the frame. These LHs are comprised of electronically controlled goniometers, rotation stages, dynamic and static mirrors, and struts. All the elements are designed with an empty cavity in the center aligned with a hole in the frame when in resting position (normal to the frame), so that the returned LiDAR signal can be transmitted towards guiding mirrors housed in the space bounded by the frame.

Transmission (Tx) subsystems: The transmitter's elements are a solid state laser that would serve as an oscillator for a Ti:Sapphire amplifier. Ti:Sapphire ultrafast high power pulses are sent through a Faraday rotator into optical couplers (OC) controlled by piezo nano positioning systems. The transmission system has an emergency laser optical beam blocking system (OBB) placed between the Faraday rotator and the OC an controlled by the microprocessor. The following element in the transmission system is a pick off mirror (POM) that collects a small portion of the outgoing beam and feeds it into detectors at the receiver for post processing of the signal depolarization. Usually the POM captures very small percentage of the outgoing beam (~1-2%). The rest of the laser radiation (98%) is then fed into an electronically controlled optical coupler and from there into the photonic crystal fibers, which release the supercontinuum (SC) radiation onto the digital mirror devices (DMD), that fine steer the outgoing beam through the empty cavities in the frame and further through the empty cavity of the primary and secondary mirror (when LH are normal to the frame at the location of the LH). In the scanning positions, when the telescope is placed at an angle different then 0° with the normal to the frame the outgoing beam is captured by the reflective surface coated on the back of the annular primary mirror and then sent onto the laser head fixed mirror (LHFM). The outgoing beam reflected off the LHFM is then sent through the annular PM and annular SM into the space surrounding the multi-lidar system.

Laser and Power: The laser used in this design is a Ti:Sapphire amplifier emitting ultrafast high power pulses down stream of oscillators, made of Erbium crystal, and emitting radiation at 1.56 um on the order of nJ/pulse. This radiation is passed through crystals for SHG (second harmonic generation) and its frequency is doubled to 780 nm which is the resonant frequency of the Ti:Sapphire. The Ti:Sapphire crystal is pumped with 532 nm from a NdYAG laser, and then is amplifying this radiation to hundreds of mj/ps. These ultrafast high-power lasers are commercially available (see Thales, Coherent, KMLabs, etc).

Optical Beam Blocker (OBB): The optical beam dumper blocks the beam in case of emergency. Suitable OBBs are commercially available and are controlled electronically.

Pick Off Mirrors (POM): Pick off mirrors capture a very small part of the outgoing signal and sends it further to detectors in the receiver (Rx). This signal has the same polarization as the outgoing beam and will be used in measuring the depolarization of the return signal.

Optical Coupler—Time Division Multiplexing (OC-TDM): The OC-TDM has an electrically controlled optical coupling system (commercially available: i.e. Newport, Thor labs, Edmund optics, etc) placed in front of a piezo controlled system that focuses the laser beam onto into each PCF sequentially based on the microprocessor commands. Considering the small cross sections of the PCFs the laser beam could also be coupled into multiple fibers simultaneously, or coupled using other techniques.

Photodiode: As the OC switches the fibers a portion of the outgoing signal is captured by a photodiode and used for triggering the ADC.

Photonic Crystal Fibers (PCF): The Photonic Crystal Fibers are suitable for supercontinuum generation in wavelength ranges between 200 and 1500 nm. The geometry of these fibers allows single mode propagation and polarization preservation. These fibers are commercially available (i.e. NKT photonics) in different formats depending on the wavelength range.

Digital Mirror Devices (DMD): Digital mirror devices allow for fine steering of the outgoing laser beam if extremely scanning capability is necessary. These are referred to throughout the paper also as MEMs.

The effective area of the Tx-RI telescope can be calculated using the following formula:

$$A_{\mathit{eff}} = \frac{\pi D^2}{4}\left[1 + \left(\frac{\pi D^2}{4\lambda z}\right)^2\left(1 - \frac{z}{F}\right)^2 + \frac{D^2}{2\rho_0^2}\right]^{-1}; \quad (2)$$

where D is the diameter of the primary mirror of the telescope, F is the focus distance (which in the instant case goes very far comparing to z. $\rho_0$ is the turbulence parameter (or efficiency saturation dimension)

$$\rho_0 = \left[\frac{4.35}{8}\left(\frac{2\pi}{\lambda}\right)^2 C_n^2 Z\right]^{-\frac{3}{5}} \quad (3)$$

Figure 5A:
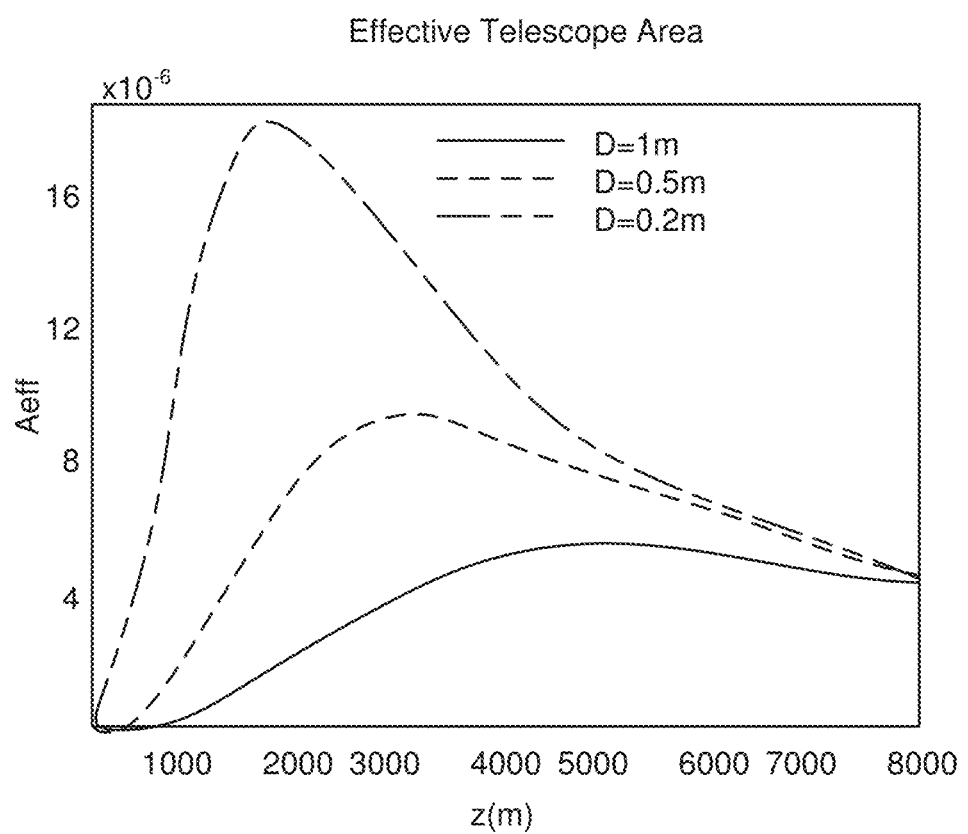
FIG. 5A, FIG. 5B and FIG. 5C re graphs depicting possible effective telescope area for different mirror diameters as a function of range and wavelength.
Figure 5B:
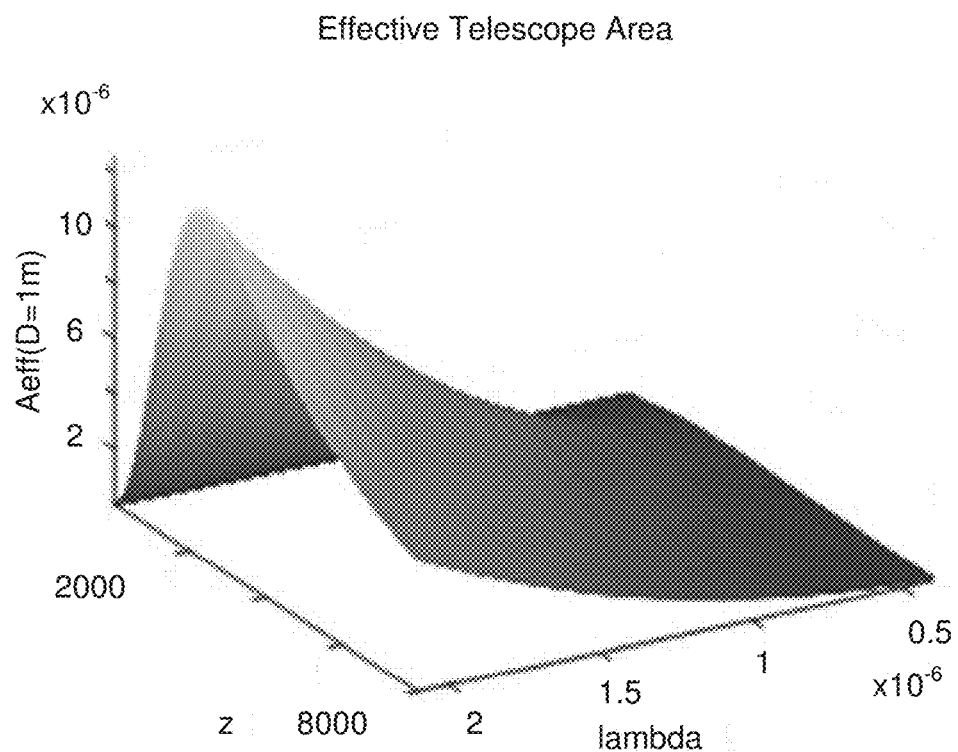
Figure 5C:
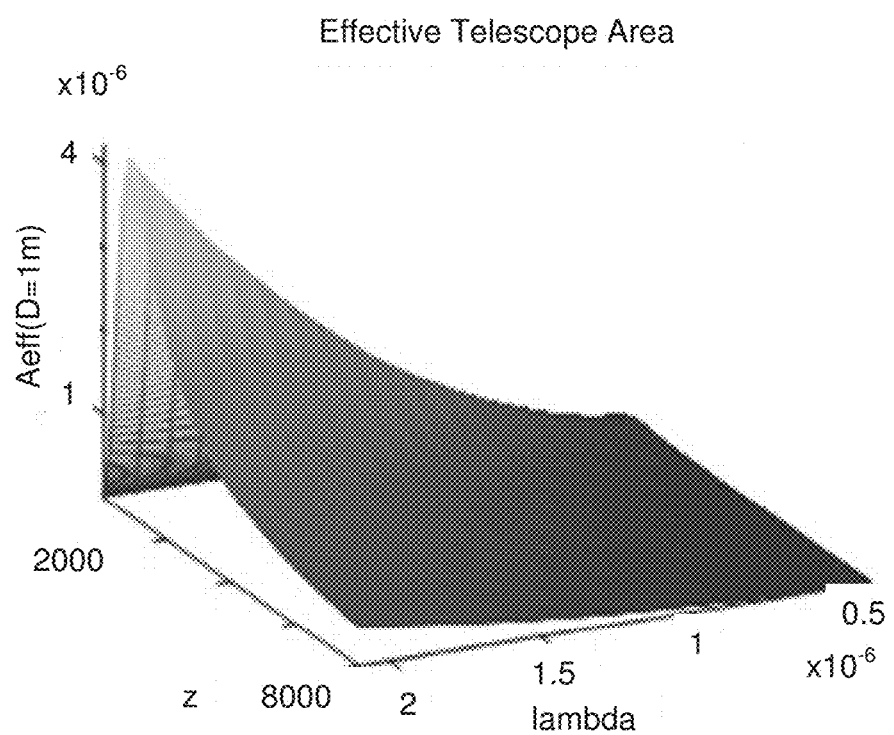

$C_n^2$ is the refractive index structure which can vary between $10^{-12}$ for strong atmospheric turbulence and $10^{-14}$ for moderate atmospheric turbulence. Calculations of the telescope effective areas are given in FIG. 5A, FIG. 5B and FIG. 5C for the different D values as indicated in the plots (FIG. 5B D is 1 m; FIG. 5C D is 0.2 m).

Rx subsystems: The receiver system of the multi-LiDAR system starts with the LiDAR heads has telescopes mounted on controlled receiver front end (rotation stage and goniometers) as illustrated in FIG. 3A. These rotation stages can be galvanometers or piezo-controlled systems and are commercially available.

Figure 6:
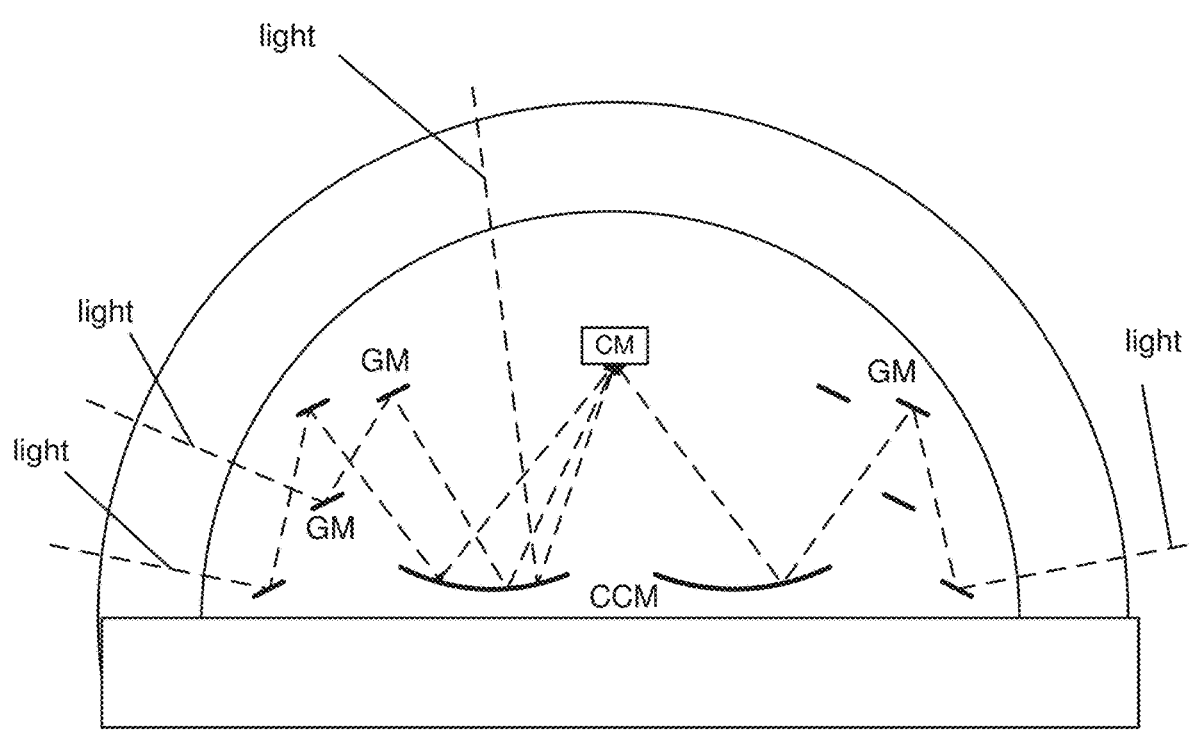
FIG. 6 is a schematic view of the space bounded by the frame with four concave collecting mirrors (CCM) given two arcuate frames are used in the design. A series of guiding mirrors (GM) direct the light toward the CCMs, which in directs the light to a central mirror (CM)

The light reflected of the annular primary mirror of one such lidar head is focused onto the annular secondary mirror and then through the hole in the frame and onto the guiding mirrors (GM) placed inside the space surrounded by the frame. In telescope positions different from normal to the frame, the light reflected of the secondary mirror is not capable to travel directly through the whole in the frame. In this situation the beam reflected off the secondary is captured by a lidar head fixed mirror (LHFM), placed in the space between the goniometer and the primary mirror. This LHFM is fixed with struts directly onto the frame. The light is then focused onto the back of the primary mirror and sent through the empty cavity of the frame onto the guiding mirror (GM). As indicated in FIG. 6, the GM are necessary only for the telescopes below the level of the four dish mirrors. In one embodiment, the optical pathway to and from the guiding mirrors is enclosed with an opaque tube that prevents interfering light from contacting the guiding mirrors. The concave collecting mirrors (CCM) can be rectangular and concave, or any other shape, such as a single mirror concave collecting mirror of annular shape placed under the frame beams. However, the later would add unnecessary weight to the design.

Figure 7:
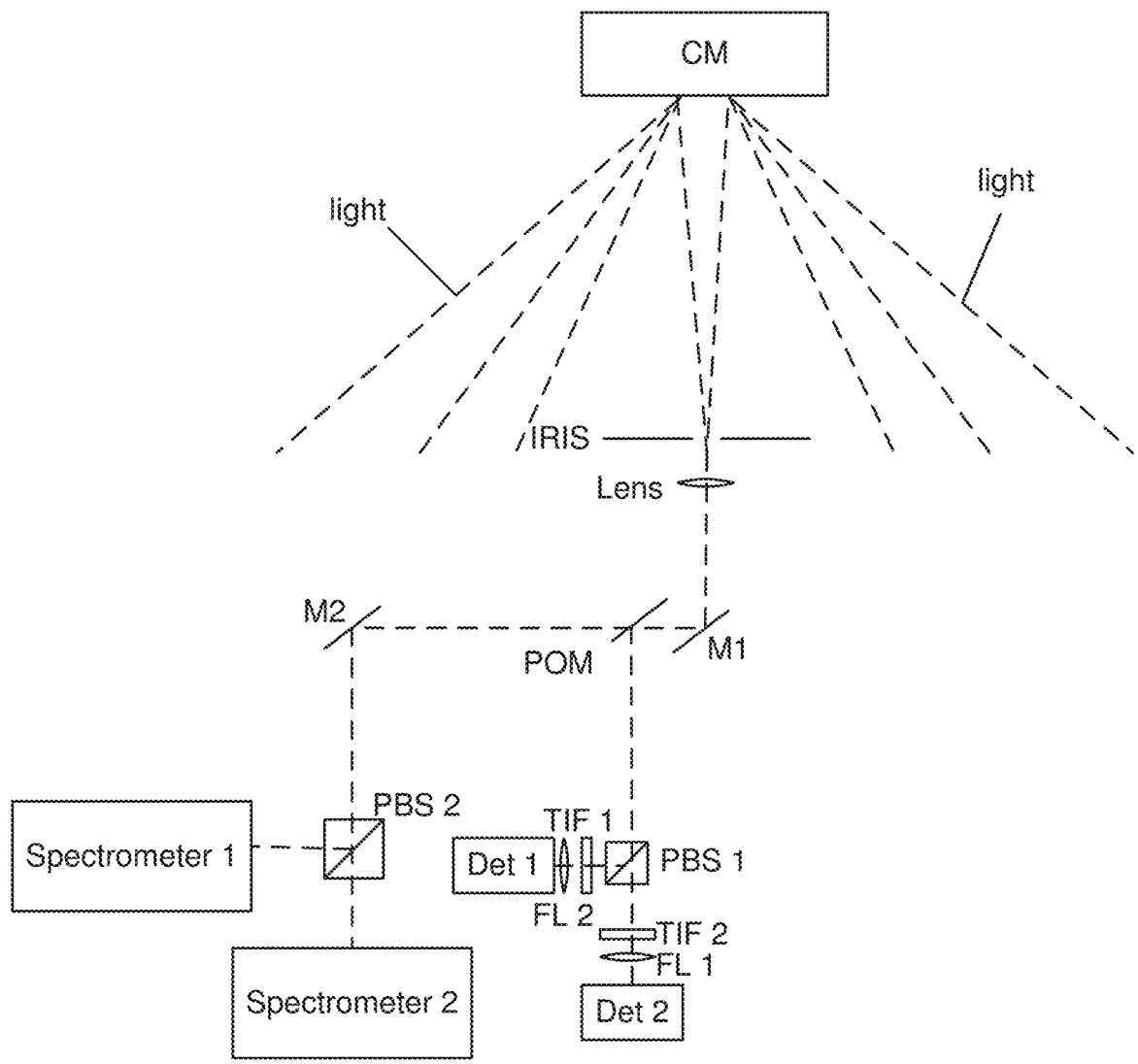
FIG. 7 illustrates the light path from the central mirror (CM) to the IRIS and collimating lens for subsequent data processing.

FIG. 6 depicts part of the receiving mirrors configuration inside the space bounded by the frame. The returned signal collected by the lidar heads and sent through holes in the frame are guided to the receiver by guiding mirrors (GM) for the lidar heads are below the collection level of the concave collecting mirror (CCM). The lidar heads above that level reflect the returned signals straight onto the CCM. The signal reflected of the CCM is then captured by the central mirror (CM) and propagated towards the field stop (IRIS) as shown in FIG. 7. Note that tubes fan be placed along the optical paths connecting the guiding mirrors to prevent leakages onto the detectors.

Light reflected off the central mirror (CM) is sent through the optical train of the receiver system to different detection modules as described below and illustrated in FIG. 7 and FIG. 8.

The focused signals are all collected on a central mirror (CM) with the focus at the field stop (IRIS) to eliminate any background noise as this is a diffraction limited lidar. The beam is then collimated and sent to M1 mirror as illustrated in FIG. 7.

The beam reflected off mirror M1 is then partially reflected off the partially reflective mirror (PRM) which can be at any up to 20% reflective. The PRM sends the return signal onto a polarization beam splitter separating the two components of the return signal. The cross and co-polarized beams are passed through clocked tunable inference filters (TF), focusing lens (FL) and then onto silicone avalanche photodiodes (Si: APD). All analog signals are then converted into digital signals and sent to further processing by the computer which controls in a feedback loop the motion of all DMDs, goniometers, rotation stages etc. These detectors can be controlled via FPGA or microprocessors. This forms the first detection module.

FIG. 7. The receiver part of the multi lidar system. Light reflected off CM (Central Mirror), propagates through the field stop (IRIS) and is then collimated in to the mirrors (M1 and M2). The pick-off mirrors (POM) reflects portion of the returned signal into the first detection module has a polarization beam splitter1 (PBS 1) which separates the parallel and perpendicular components of the signal. These signals are passed through tunable Fabry Perrot interference filters (TIF 1 and TIF2) and focusing lenses (FL1 and FL2). The detectors are Si:APD with broad detection ranges (350 nm to 1100 nm). The signal reflected off mirror M2 is going into the second receiving module. This module has a polarization beam splitter (PBS 2) which separates the parallel and perpendicular components of the signal. These signals are then collected by two spectrometers working in the UV-VIS-NIR ranges.

The remaining 80% of the return signal is sent to the second detection module. In this module the return beam is reflected off mirror M2 and into a polarization beam splitter (PBS 2) that separates the perpendicular and parallel polarization components of the signal, which will be detected by spectrometers 1 and 2. The spectrometer collect the signal and provide power spectral density of the signal. The spectrometers are commercially available in all wavelength ranges.

If the detection range of the spectrometers does not cover the entire spectrum, mirror M2 can be replaced by a beam splitter (BS) that reflects part of the spectrum detectable by spectrometers 1 and 2, while transmitting the remaining spectrum. The transmitted beam is reflected by mirror M3 (could be mirror M2 but for the sake of simplicity and clarity it is labeled as M3) into a PBS 3 and then two spectrometers, in a design similar to the one described above (see FIG. 8). This would form detection module 3.

Figure 8:
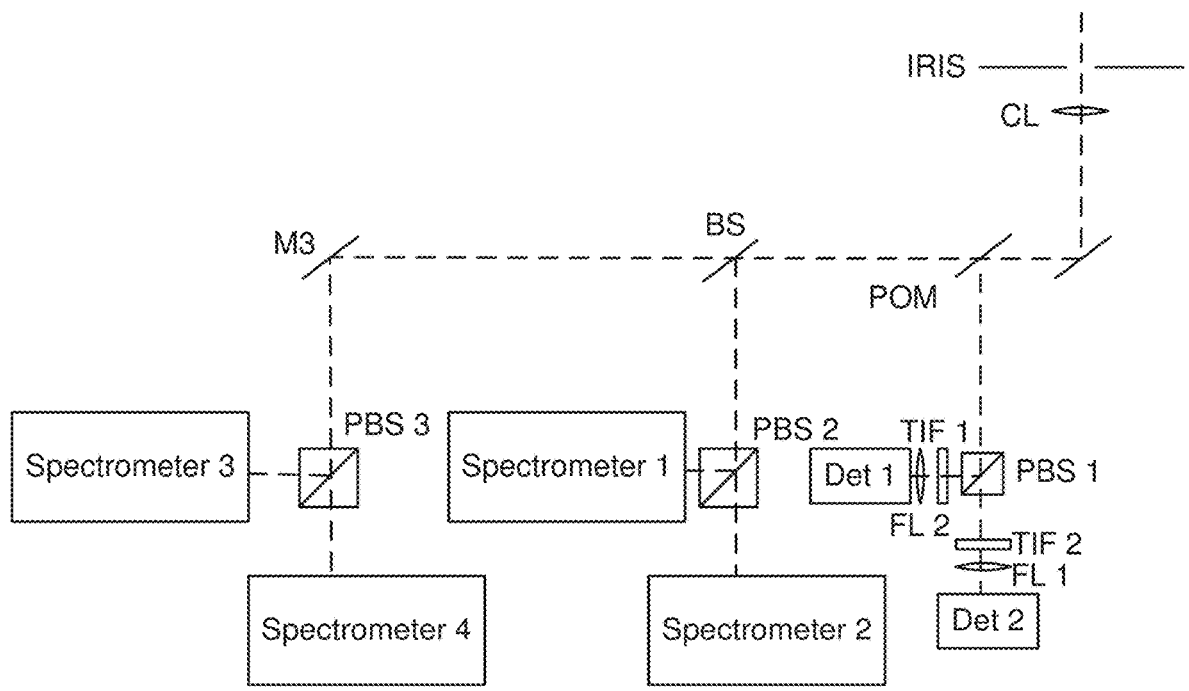
FIG. 8 depicts one possible light path wherein a beam splitter (BS) is used to route the light to multiple spectrometers.

FIG. 8 Alternative design of the detector end of the multi-LiDAR system with multiple receiving modules, based on the spectral range covered by the supercontinuum light emitted by the PCF.

The motivation for retrieval of the different polarizations resides on the importance of the depolarization of the signal for different types of targets. This design will allow the retrieval of speed and type of target (atmospheric, human made, or nature).

Receiver (Rx) Optical Train: Mirrors, Polarization Detection, Tunable interference filters, focusing lenses, avalanche photodiodes (APD), spectrometers, analog digital converters (ADC).

Mirrors: All mirrors along the Rx optical train are either Enhanced Aluminum or Enhanced Silver mirrors for broadband reflections in the UV, VIS, NIR, MIR and LIR range. These mirrors are commercially available (see Edmund Optics). In case the system is used in LIR copper mirrors are also an option.

Polarization Detection: The signals reflected off the pick off mirror (POM) and mirror M2 are passed through two polarizing beam splitters and the resulting components are sent to the Si APD or photomultiplier tubes (PMT), and Spectrometers, respectively. For more accurate signal depolarization measurements, a portion of the transmitted beam can be fed into the detectors Det 1 and Det 2.

Tunable interference filters: MEMs Fabry Perot tunable filters are placed between the pick off mirrors (POM) and focusing lenses (FL) in front of the Si avalanche photodetectors (SiAPD) or PMTs. These filters allow fine spectral tuning in the wavelength range between 800-2000 nm at a frequency of 400 KHz. The filters are commercially available (see Axsun)

Focusing lenses: The lenses are placed in front of the two APDs focusing the co-polarized and cross-polarized signals. These lenses are achromatic and are commercially available.

APD: The Si avalanche photodiodes (APDs) or PMTs are used to collect a portion of the return signal using a pick off mirror to determine the atmospheric contributions to the collected signal. These are then subtracted from the signal scattered by a moving target. Additionally, it can be used to determine the wind velocities. The sensors cover the spectrum between 300 nm to 1100 nm and are available commercially (see Hamamatsu). The sensors are controlled via FPGAs (Field Programmable Arrays) or other microprocessors commercially available.

Spectrometers: The receiving system will use two or more commercially available spectrometers. Most spectrometers cover a broadband range in UV-VIS-NIR. If the supercontinuum signal emitted by the PCFs is broader then the detection range of the spectrometers, a second set of spectrometers with detection ranges in the remaining band IR will be used, such that the entire spectrum is detected. Usually these detectors are made of HgCdTe (mercury cadmium telluride) or InSb (indium antimonide) materials that cover the entire MIR spectrum. For wavelengths in the LIR (10 um for example) photon drag detector can be used.

ADC (analog to digital converter): The analog signal coming out of the detectors is converted via digital conversion which is done by standard converters commercially available (see National Instruments). The detection rate of the ADC is set to more than 120 Hz which is twice the drone propeller beat. The digital signals collected at this rate are sent further to processors.

Processing system and synchronization: A generic scanning procedure of each LiDAR 102 along each semispherical axis performs a full cycle in a time interval $\Delta t_{cycle}$, is explained in the steps below. All these positions are coded into an FPGA or a microprocessor based on the user's needs. The steps here are given just as a guideline to facilitate a better understanding of the system.

At first, the scanning starts in the fine scanning mode performed by DMDs or MEMs. Once the fine scanning is completed, the coarse scanning is performed using the goniometer and rotation stages.

Fine Scanning:

Step 1. At time $t_0$, all LiDAR 102 perform a full scanning of a two dimensional plane; this plane is at an angle $\theta_{initial}$ (can be 0 or 90°-parallel to a plane tangent to the frame at the location of the lidar) with respect to the normal (N) to the frame, at the point of connection between the rotation stage 108 holding the LiDAR 102 and the frame 106, 108.

Step 2. During the fine scanning the position of the mirror is changed such that the scanning plane is up to the next level equivalent to an angle $\theta_{initial}+\Delta\theta_{inc\_fine}$ allowed by the goniometers and DMDS (of MEMs). Each step elevates the 2D scanning plane by $\theta_{initial}+\Delta\theta_{inc\_fine}$. Each scan performed by the MEMS at a given position on the goniometer and rotation stage adds an incremental time $\Delta t_{fine}=\Delta t_{scan\_fine}+\Delta t_{nap\_fine}$ The total time for the fine scanning is $t_{fine}=f^*\Delta t_{fine}$, where f represents the number of allowed 2D scanning levels by the DMDs/MEMS (predefined by the opening in the secondary mirror), in terms of angular motion. A time $\Delta t_{nap\_fine}$ is required by the DMDs/MEMS to move to the new scanning 2D plane, which is almost instantaneous. Here, nap stands for "new angular position". At the end of the fine scanning procedure time $t_1=t_{fine}$.

Coarse Steering

Once the maximum angular change has been reached by MEMS, the rotation stage 108 perform the coarse steering by changing the positions of the telescopes on the LiDAR 102 ($LH_n$) by an additional angular displacement $\Delta\theta_{inc\_coarse}$ induced by the goniometer (G1) from its initial angular position along the direction of the axes (branch) on which the LiDAR 102 is mounted. At time $t_2=t_1+\Delta t_{Gi}$, the lidar head is in new angular position predefined by the rotation stage 108. The time necessary for this angular change in position is denoted by $\Delta t_{Gi}$. At time $t_3=t_2+t_{fine}$, the fine steering is achieved by repeating steps 1 and 2. This happens for each LiDAR 102, meaning that each lidar performs a second full fine scanning in its new 2D plane.

At time $t_3$ the rotation stage changes the position of goniometer G2 sequentially by a predefined incremental step for a total of r steps. Please note that the LH telescope is fixed on G2 in this step. In each new position of the rotational stage the fine steering is performed again. Time needed is denoted by the rotational stage to move to its new position (each rotational step that induces an incremental change in the position of the telescope on a radius given by G1) with $\Delta t_{rs}$. The total revisit time after full revolution is $\Delta t_{rt}=r^*(\Delta t_{rs}+t_{fine})$.

At time $t_4=r^*(\Delta t_{rs}+t_{fine})+t_3$ goniometer G2 changes the position of the telescope with another incremental step, and at $t_5=t_4+t_{Gi}$ the rotation stage starts a new rotational cycle with the same number of steps p or different depending on the user. The incremental step in the change in the position of the LH on G2 leads to a total of g number of steps, based on the user's needs.

The total number of incremental changes in the angular positions on G2 is denoted by $\Delta\theta_{G2\_coarse}$ and is necessary for the multi-lidar system to perform a full hemispherical coverage, where v is the number of incremental coarse changes in the angular position of G2.

The total time of a full scan with goniometer G2 and rotational stage RS, between the initial angular position and the initial angular position, is calculated by summing up all scan and nap times. For example, if the angular position changes in f*g*r steps, the total revisit time (time required by the LiDAR 102 to arrive to the initial angular position at which it was at $t_0$, $\theta_{initial}$ with respect to the normal (N)) is:

$$\Delta t_{G2\_RS\_cycle} = t_{fine} + g*(\Delta t_{rt} + t_{Gi}) == (\Delta t_{scan_{fine}} + \Delta t_{nap_{fine}}) + \quad (4)$$
$$g*\left\{r*\left[\sum_{j=1}^{f}(\Delta t_{scan_{fine}} + \Delta t_{nap_{fine}}) + \Delta t_{rs}\right] + \Delta t_{Gi}\right\}.$$

A third coarse motion is given by the goniometer (G1) mounted on the frame. The lidar head can perform all motions described above and in addition can slide around the holding branch controlled by G1. This would add extra temporal and angular steps in the scanning procedures. These additional degrees of freedom will allow all lidar heads placed on two coplanar branches of the frame to point in the same direction.

Temporal Resolution:

Under normal operation, all individual lidar heads on all branches start scanning at the same time.

$$t_{0,b_1}=t_{0,b_2}=t_{0,b_3}=\ldots=t_{0,b_v} \quad (5)$$

where $t_{0,b_1}=t_{0,b_2}=\ldots=t_{0,b_j}$ represent the scanning start time of each semicircular axis (branches), and j represents the number of semicircular axis (branches). The temporal resolution within a 2D plane of all individual lidar heads placed at the same level, on all branches with respect to the base of the frame, increases proportionally with the number of semicircular axes (branches) as follows:

$$\Delta t_{res}^{j,k} = \frac{\Delta t_{res}^{k}}{j} \quad (6)$$

where $\Delta t_{res}^{j,k}$ determines the temporal resolution of the multilidar system with j branches, and k individual lidar heads between the base and top of the frame (temporal resolution is the inverse to $\Delta t_{res}^{v,k}$). The temporal resolution of a 2D plane (perpendicular to the axis of symmetry of the frame—a vertical line going through the center of the base and coming out through the top of the dome—, and which contains the projections of the laser beams from the individual lidars placed at the same level on the branches of the frame) is higher than the resolution of the projections, in the same plane, of the lidars placed on a lower level. That is $$\Delta t_{res}^{j,1} > \Delta t_{res}^{j,2} > \ldots > \Delta t_{res}^{j,k} \qquad (7)$$

The data from each individual lidar is loaded in real time into the lidar datapoint cloud, analyzed, and determine the characteristics of the lying object in near real time using developed algorithms such as IKENA ISR, ASPERA, SCENE LT, FOCUS3D, LabVIEW, MATLAB, Leica, Spatial Analyzer, etc). If a persistent target or a particular pattern is detected, the position of all the individual lidars heads can be controlled to point simultaneously in the direction of the target and scan in synchronization with each other, to retrieve an image that has a spatial resolution which varies inversely proportional with the distance between the multi-lidar system and the target.

The lidars can be controlled by the processor based on the inputs of the individual lidars themselves, as well as the tracking lidar on the top of the frame.

Processing System and Synchronization

The scanning procedure of each LiDAR 102 performs a full cycle in a time interval $\Delta t_{cycle}$, as explained in the steps below:

Step 1. Between time $t_0$ and time $t_1$ ($\Delta t_{scan\_fine}$), each LiDAR 102 on the same semispherical axis performs a full scanning in a two dimensional plane (the plane of the LiDAR); plane which is at an angle $\theta_{initial}$ with respect to the normal (N) to the tangent to the semispherical axis at the point of connection between the goniometer 110 holding the LiDAR 102 and the axes of the respective semicircular arcuate frame 104, 106.

Step 2. At the end of the first scanning, at time $t_1$, the MEMS changes the scanning plane up to the next angle $\theta_{initial} + \Delta\theta_{inc\_fine}$ allowed by the MEMS system. Each step elevates the 2D scanning plane by $\theta_{initial} + \Delta\theta_{inc\_fine}$. Each scan performed by the MEMS adds an incremental time $\Delta t_{fine}$. The total time for the MEMS scanning is $m^*\Delta t_{fine}$, where m represents the number of allowed 2D scanning levels by the MEMS, in terms of angular motion. A time $\Delta t_{nap\_fine}$ is required by the MEMS to move to the new scanning 2D plane, which is almost instantaneous. Here, nap stands for "new angular position".

Once the maximum angular change has been reached by MEMS, due to LHFM dimensions and hole in the frame, LHMF, and telescope; the rotation stage 108 changes the positions of the LiDARs 102/LiDAR mirrors $MA_n$ by an additional angular displacement $\Delta\theta_{inc\_coarse}$, from its initial angular position towards the normal (N) along the direction of the axes (branch) on which the LiDAR 102 is mounted. At time $t_2 = t_1 + m^*(\Delta t_{scan\_fine} + \Delta t_{nap\_fine})$, the new angular position of each LiDAR 102 is completed by the three-axis actuator. The time necessary for this angular change in position is denoted by $\Delta t_{nap\_coarse}$.

Step 3. At time $t_3 = t_2 + \Delta t_{nap\_coarse}$, steps 1 and 2 repeat for each LiDAR 102 on the same semispherical axis, meaning that each lidar performs a second full scanning in its new 2D plane, and a new fine scanning starts.

The steps above repeat for the required number of incremental changes in the angular positions $\Delta\theta_{inc\_coarse}$ necessary for the multilidar system to perform a full hemispherical coverage. The total scanning range ($\Delta\theta_{coarse\_cycle}$) for the cycle of each LiDAR 102, is symmetrical with respect to the normal N and is expressed as:

$$\Delta\theta_{coarse\_cycle} = \Sigma_{n=0}^{n} \Delta\theta_{inc\_coarse,i} \qquad (8)$$

where n is the number of incremental coarse changes in the angular position.

The total time of a full scan, between the last angular position and the initial angular position, is calculated by summing up all scan and nap times. For example, if the angular position changes in m*n steps, the total revisit time (time required by the LiDAR 102 to arrive in the initial angular position at which it was at $t_0$, $\theta_{initial}$ with respect to the normal (N)) is:

$$\Delta t_{coarse\_cycle} = \Sigma_{i=1}^{n} \Delta t_{coarse\_scan,i} + \Sigma_{i=1}^{n} \Delta t_{nap\_coarse,i} = n^* \Sigma_{j=1}^{m}(\Delta t_{scan\_fine} + \Delta t_{nap\_fine})) + \Sigma_{i=1}^{n} \Delta t_{nap\_coarse,i} \qquad (9)$$

Under normal operation, all individual LiDARs 102 on all semicircular arcuate frames start scanning at the same time.

$$t_{0,b_1} = t_{0,b_2} = t_{0,b_3} = \ldots = t_{0,b_v} \qquad (10)$$

where $t_{0,b_1} = t_{0,b_2} = \ldots = t_{0,b_v}$, represent the scanning start time of each semicircular arcuate frame, and v represents the number of semicircular arcuate frame. The temporal resolution within a 2D plane of all individual LiDARs placed at the same level, on all semicircular arcuate frames with respect to the base of the frame, increases proportionally with the number of semicircular arcuate frames as follows:

$$\Delta t_{res}^{v,k} = \frac{\Delta t_{res}^{k}}{v} \qquad (11)$$

where $\Delta t_{res}^{v,k}$ determines the temporal resolution of the multi-LiDAR system with v semicircular arcuate frames, and $k^{th}$ individual LiDARs between the base and top of the frame (temporal resolution is the inverse to $\Delta t_{res}^{v,k}$). The temporal resolution of a 2D plane (perpendicular to the axis of symmetry of the frame—a vertical line going through the center of the base and coming out through the top of the dome—, and which contains the projections of the laser beams from the individual LiDARS 102 placed at the same level on the branches of the semicircular arcuate frame) is higher than the resolution of the projections, in the same plane, of the LiDARs placed on a lower level. That is $$\Delta t_{res}^{v,1} > \Delta t_{res}^{v,2} > \ldots > \Delta t_{res}^{v,k} \qquad (12)$$

The LiDARs can be controlled by the processor based on the inputs of the individual LiDARs themselves as well as the tracking lidar on the top of the frame. The data from each individual LIDAR is loaded in real-time into the cloud of data from which the main processor, retrieves the required files, analyzes, and maps the retrieved ranges on a screen in near real time using developed algorithms such as IKENA ISR, ASPERA, SCENE LT, FOCUS3D, LabVIEW, MATLAB, Leica, Spatial Analyzer, etc). If a persistent target or a particular pattern is detected, the position of all the individual LIDARs can be controlled to point simultaneously in the direction of the target and scan in synchronization with each other, to retrieve an image that has a spatial resolution which varies inversely proportional with the distance between the multi-LiDAR system and the target.

The disclosed system permits detection of the velocity and direction of UAVs based on coherent Doppler LiDAR techniques which involve homodyne detection and polarization control. The system also allows one to perform spectral discrimination of vegetation, birds, and UAVs based on reflectance spectra of the returned signal which covers a broad band known as UV-VIS-NIR (i.e. 400 nm to 1800 nm), or MIR (1200 nm to 2100 nm), or other wavelength range depending on the choice of laser and fiber used for supercontinuum creation. Additionally, propeller frequency can be detected for rotary drones using high frequency LiDAR pulses (i.e. a minimum sampling rate of 120 Hz in order to detect the 60 Hz frequency of the propellers). The imaging is done using lidar data point clouds software.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A LiDAR system comprising:
    a first arcuate frame and a second arcuate frame, wherein the first arcuate frame and the second arcuate frame are disposed perpendicular one another and defining a volume of an interior dome;
    a plurality of LiDAR heads, each connected to either the first arcuate frame or the second arcuate frame by a first goniometer, a second goniometer and a rotation stage, such that each LiDAR head can be independently rotated with six degrees of freedom;
    a computer processor for independently actuating the rotation stage, the first goniometer and the second goniometer of each LiDAR head in the plurality of LiDAR heads;
    wherein the volume of the interior dome houses:
        a laser source that supplies laser light to the plurality of LiDAR heads;
        a central mirror (CM);
        a plurality of guiding mirrors (GM);
        at least one concave collecting mirror (CCM) that directs reflected laser light from the LiDAR heads to the central mirror (CM) using the plurality of guiding mirrors (GM);
        at least one spectrometer for processing the reflected laser light.

2. The LiDAR system as recited in claim 1, a tracking LiDAR disposed at a junction of the first arcuate frame and the second arcuate frame.

3. The LiDAR system as recited in claim 1, further comprising a circular base, wherein the first arcuate frame and the second arcuate frame are both disposed perpendicular to the circular base.

4. The LiDAR system as recited in claim 1, wherein at least one LiDAR head in the plurality of LiDAR heads comprises a dynamic telescope comprising:
    a LiDAR head frame supporting (1) an annular primary mirror (PM) with a reflective front surface and a reflective back surface (2) an annular secondary mirror (SM) mounted with struts on the annular primary mirror (PM) (3) a LiDAR head fixed mirror (LHFM) with a hole, mounted on struts, directly on the LiDAR head frame;
    wherein the dynamic telescope is controlled by a dynamic telescope rotation stage and two dynamic telescope goniometers that provide six degrees of freedom, the dynamic telescope being disposed on either the first arcuate frame or the second arcuate frame.

5. The LiDAR system as recited in claim 1, wherein the laser source comprises photonic crystal fibers (PCF).

6. The LiDAR system as recited in claim 1, wherein each LiDAR head comprises
    a LiDAR head fixed mirror (LHFM) with an LHFM hole;
    an annular primary mirror (PM) with an annular primary mirror hole, wherein the annular primary mirror (PM) is reflective on both a front surface and a rear surface that is opposite the front surface;
    an annular secondary mirror (SM) with an annular secondary mirror hole;
    wherein the annular primary mirror hole, the annular secondary mirror hole and the LHFM hole are aligned.

7. The LiDAR system as recited in claim 6, wherein the reflected laser light travels through the annular second mirror hole, through the annular primary mirror hole, reflects off the LiDAR head fixed mirror (LHFM), reflects off the rear surface of the annular primary mirror (PM) and travels through the LHFM hole and into the interior dome where the reflected laser light contacts the plurality of guiding mirrors (GM), before reflecting off the at least one concave collecting mirror (CCM).

8. The LiDAR system as recited in claim 7, wherein the annular secondary mirror (SM) is mounted directly on the annular primary mirror (PM) with struts, such that the annular primary mirror hole and the annular secondary mirror hole are coaligned.

9. The LiDAR system as recited in claim 1, wherein at least one opaque tube is present in an optical pathway between a first guiding mirror and a second guiding mirror in the plurality of guiding mirrors, the opaque tube preventing interfering light from entry into the optical pathway.

10. The LiDAR system as recited in claim 1, further comprising a scanning LiDAR head mounted at an intersection of the first arcuate frame and the second arcuate frame.

11. A method for detecting an object using LiDAR, the method comprising:
    detecting a target of interest using a LiDAR system comprising:
        a first arcuate frame and a second arcuate frame, wherein the first arcuate frame and the second arcuate frame are disposed perpendicular one another and defining a volume of an interior dome;
        a plurality of dynamic LiDAR heads, each connected to either the first arcuate frame or the second arcuate frame by a first goniometer, a second goniometer and a rotation stage, such that each dynamic LiDAR head can be independently rotated with six degrees of freedom;
        a computer processor for independently actuating the rotation stage, the first goniometer and the second goniometer of each dynamic LiDAR head in the plurality of dynamic LiDAR heads;
        wherein the volume of the interior dome houses:
            a supercontinuum laser source that supplies laser light to the plurality of dynamic LiDAR heads;
            a central mirror (CM);
            a plurality of guiding mirrors (GM);
            at least one concave collecting mirror (CCM) that directs reflected supercontinuum laser light from the dynamic LiDAR heads to the central mirror (CM) using the plurality of guiding mirrors (GM);

at least one spectrometer for processing the reflected supercontinuum laser light;

wherein, upon detection of the target of interest, the microprocessor actuates the rotation stage, the first goniometer or the second goniometer of at least one additional dynamic LiDAR head from the plurality of dynamic LiDAR heads such that the at least one additional dynamic LiDAR head emits supercontinuum laser light on the target of interest, thereby enhancing imaging of the target of interest.

* * * * *